United States Patent

Martindale

[11] 4,140,629
[45] Feb. 20, 1979

[54] CONICAL SCREEN SEPARATOR
[75] Inventor: James H. Martindale, Middletown, Ohio
[73] Assignee: Martco, Inc., Middletown, Ohio
[21] Appl. No.: 833,442
[22] Filed: Sep. 15, 1977
[51] Int. Cl.$^2$ ............................................. B07B 1/24
[52] U.S. Cl. .................................. 209/240; 209/293; 209/270; 210/403
[58] Field of Search ............... 209/240, 243, 255, 264, 209/265, 263, 261, 270, 268, 289, 290, 298, 297, 296, 292, 299, 279, 280, 389, 288, 380, 303, 304, 273; 210/403, 384

[56] References Cited
U.S. PATENT DOCUMENTS

| | | | |
|---|---|---|---|
| 973,149 | 10/1910 | Warner | 209/270 |
| 1,054,323 | 2/1913 | Steele | 209/270 |
| 1,169,986 | 2/1916 | Middaugh | 209/297 |
| 1,277,051 | 8/1918 | Dull | 209/270 |
| 1,294,757 | 2/1919 | Bentivegna | 209/270 |
| 1,489,975 | 4/1924 | Bluhm | 209/299 |
| 1,897,156 | 9/1931 | Wells | 209/297 |
| 2,286,132 | 6/1942 | Walle | 209/270 |
| 2,295,937 | 9/1942 | Crane et al. | 210/403 |

Primary Examiner—Robert Halper
Assistant Examiner—Jon Hokanson
Attorney, Agent, or Firm—Melville, Strasser, Foster & Hoffman

[57] ABSTRACT

A frusto-conical screen separator having its longitudinal axis inclined from the horizontal so that its undersurface lies in an essentially horizontal plane, the separator being divided internally into three zones, the first zone comprising a dewatering zone at its largest diameter end, the second zone comprising a washing zone, and the third zone comprising a final dewatering zone at its smallest diameter end, the separator having external shower means overlying the first and second zones, breaker bars in the first zone, internal baffle means in the second zone, and guide bars in the third zone, the materials to be separated passing through the separator from its larger to its smaller end, a recovery tank underlying the separator for recovering separated materials passing through the screen, the unscreened residual materials being discharged at the smaller end of the separator.

10 Claims, 4 Drawing Figures

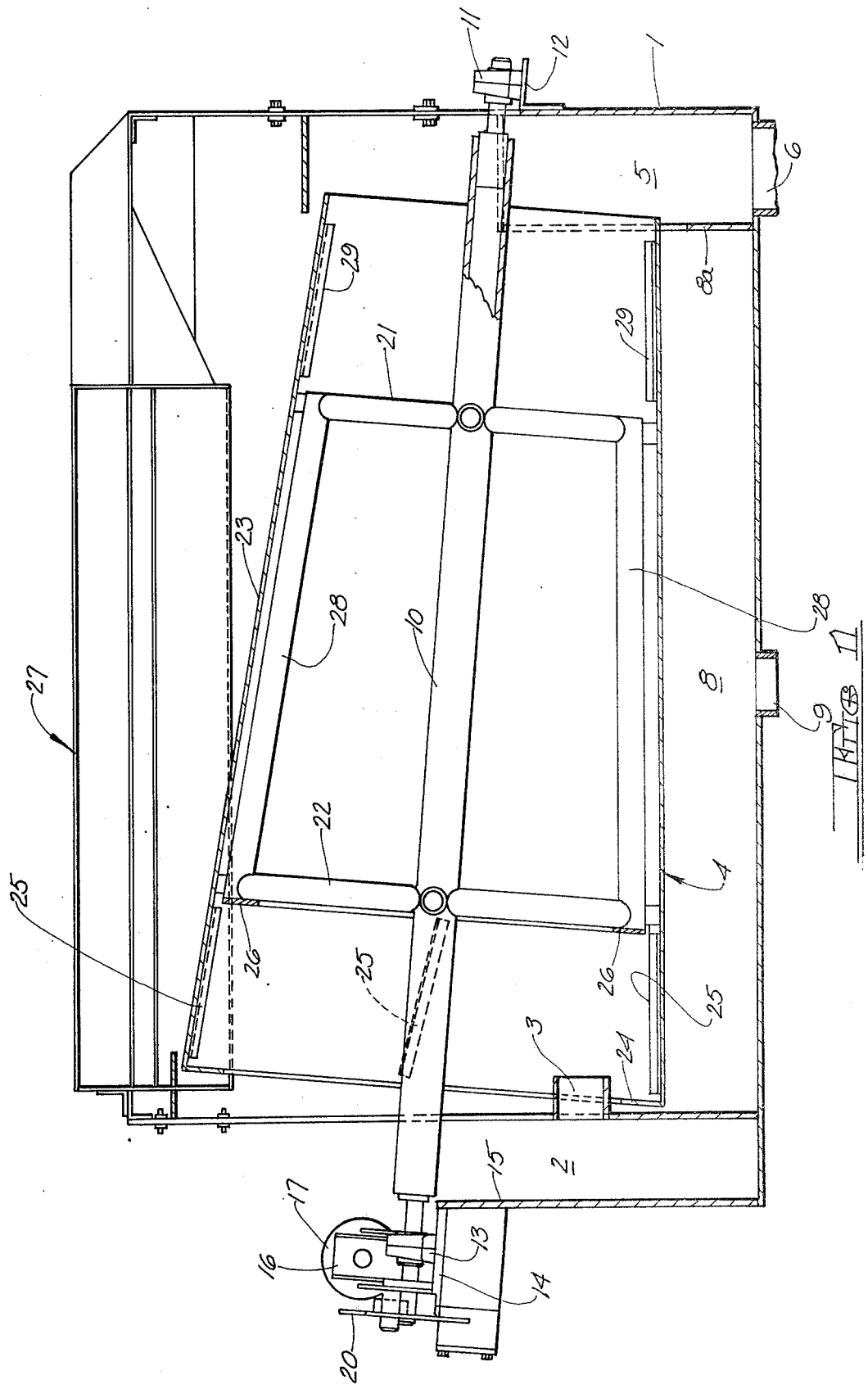

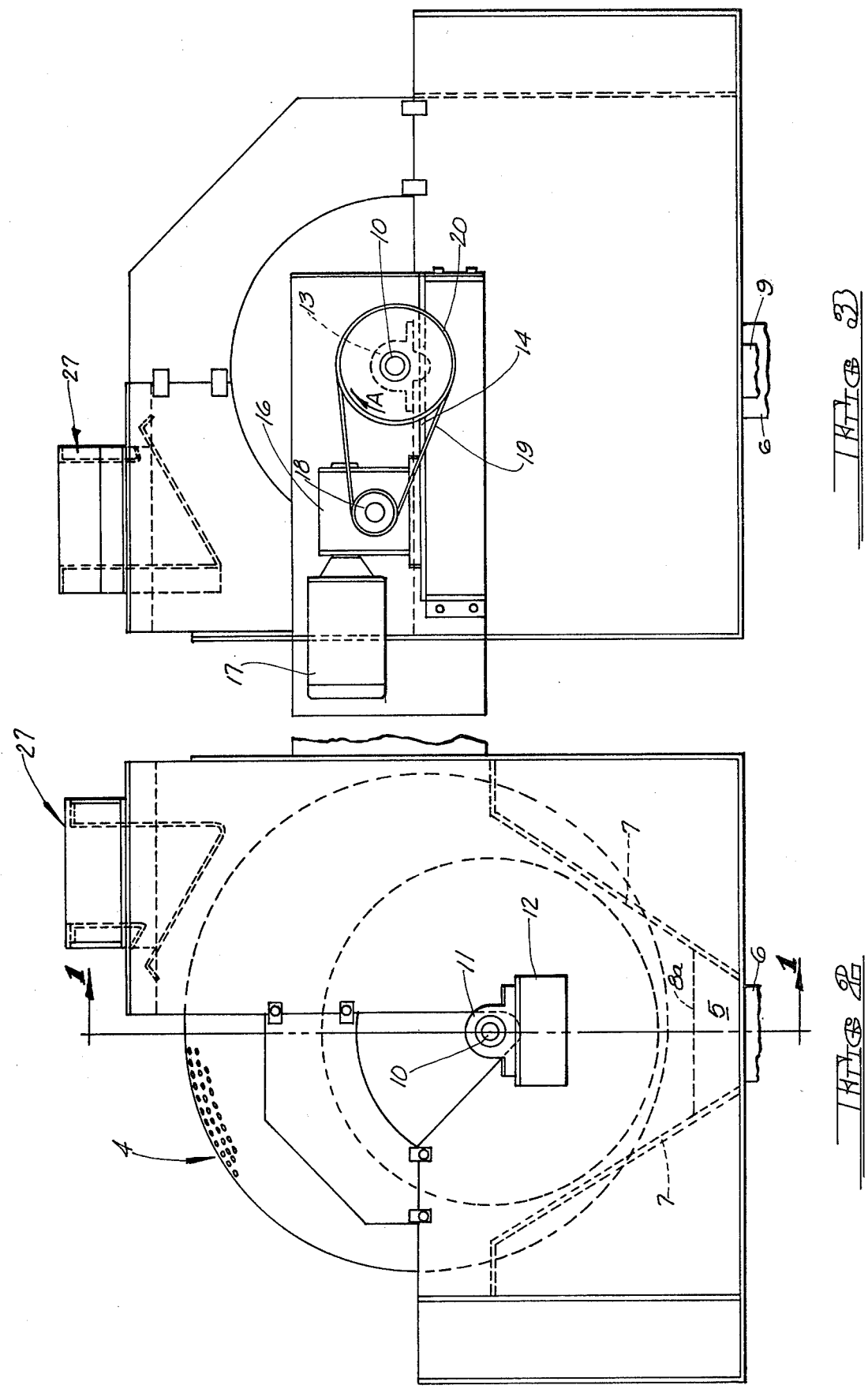

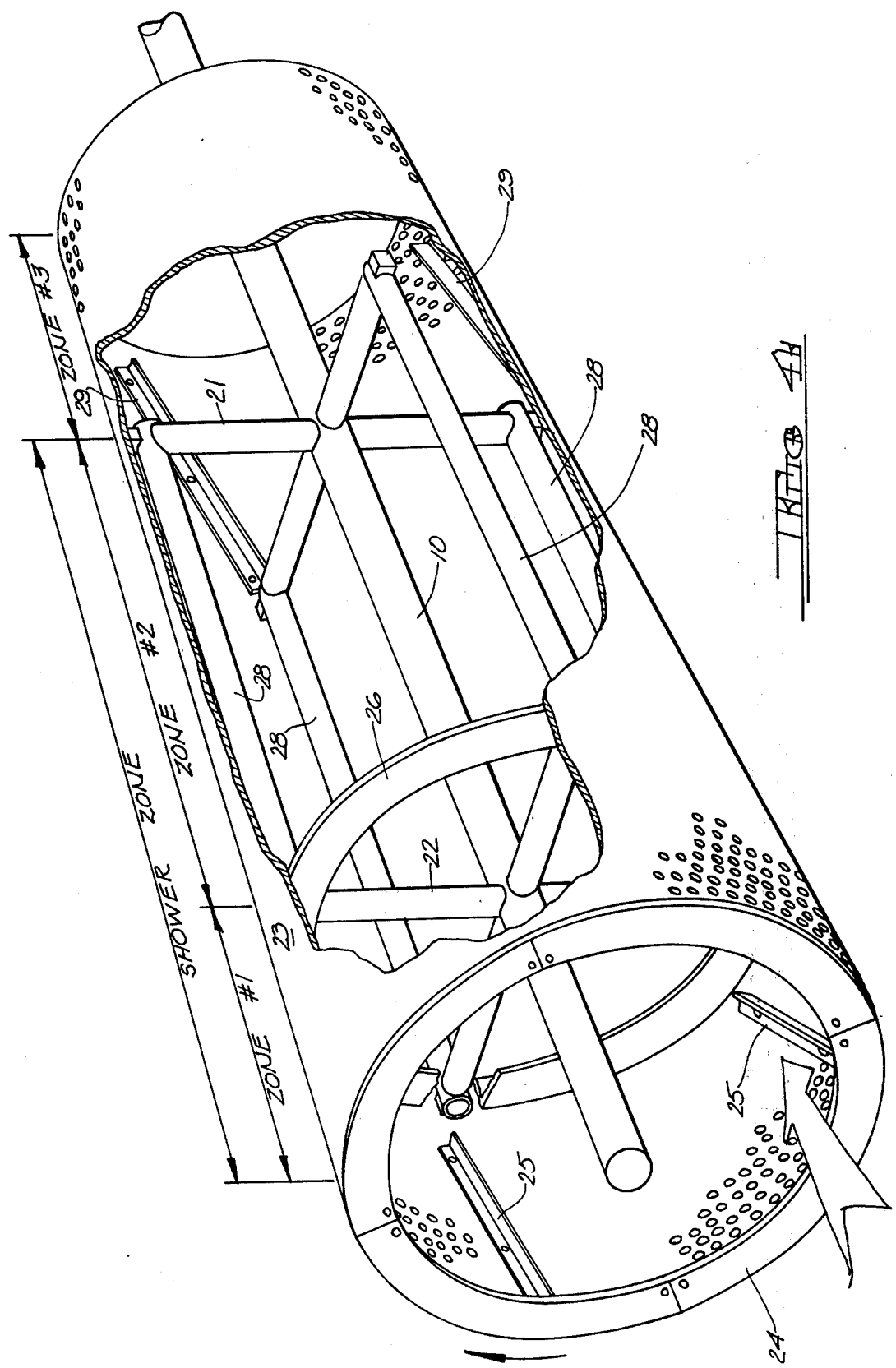

CONICAL SCREEN SEPARATOR

BACKGROUND OF THE INVENTION

This invention relates to rotary screening and dewatering apparatus, and has to do more particularly with apparatus adapted to classify or separate, or to concentrate or thicken materials, such as the liquid slurries used in various pulp and paper making processes.

While numerous devices have hitherto been proposed for dewatering solids and fiber reclamation purposes, including the use of rotatable cylindrical screens provided with diverse arrangements for agitating and washing the materials being treated, such devices have suffered from a lack of efficiency having a relatively low rate of throughput as well as requiring excessive down-time for cleaning purposes. Efforts to increase throughput have generally been directed toward the provision of larger units which, while increasing capacity, also materially increase the cost of the units as well as the amount of space they occupy, which is often at a premium in the mill.

In contrast to the direction taken by the prior art, the present invention relates to the provision of a screen separator which is extremely compact and yet highly efficient, the unit being effectively self-cleaning and capable of operating for long periods of time without being shut down for maintenance purposes.

SUMMARY OF THE INVENTION

In accordance with the present invention, the screen separator is of conical configuration, being in the form of a rotating frustrum of a cone with its axis of rotation inclined so that its undersurface lies in an essentially horizontal plane, the geometry of the cone acting to move the materials being processed from its larger to its smaller end.

The separator is of extremely simple and efficient construction, comprising a center shaft which defines the axis of the cone, the shaft mounting spaced apart sets of radially extending spiders to which the cone forming screen is secured. The screen itself may be fabricated from metal or plastic materials having openings of the desired sizes and shapes to separate the materials being processed.

In accordance with the invention, the cone screen is divided into three zones, the first of which lies immediately adjacent the larger or entrance end of the cone screen, the first zone acting to thicken or concentrate the incoming raw material which is introduced into the inside bottom of the rotating cone by gravity flow. Where the incoming material comprises, for example, a dilute slurry containing usable fibers and waste materials, the slurry is dewatered so that some of the usable fibers are carried through the perforations in the cone screen along with the water, whereupon the residual materials are retained on the perforated screen and thus thickened or dewatered, the retained material being advanced to the second or washing zone by means of the geometry of the cone and a set of curved breaker bars secured to the inner surface of the cone screen. The cone screen has a peripheral dam at its leading end to prevent the incoming raw materials from spilling out of the entrance end of the first zone; and similarly, a second peripheral dam is provided between the first and second zones to prevent surges of incoming raw materials from flowing directly into the second zone, the second dam having clearance between its outside diameter and the inside diameter of the cone screen.

The second zone of the cone screen is designed to repeatedly wash or decant the thickened or concentrated raw materials which have collected on the inner surface of the cone screen, such washing process acting to remove usable fibers from the residual materials or rejects which will not pass through the perforations in the screen. Throughout the length of the second zone, which comprises approximately three-fifths of the length of the screen cone, a series of longitudinal baffles are mounted parallel to the inner surface of the cone, the baffles preferably extending between the sets of spiders which support the cone screen. The baffles, which are preferably cylindrical in cross-section, are mounted with clearance between their outermost surfaces and the inside of the cone screen. As the cone screen rotates, the baffles act to carry the thickened raw materials into the upper area of the cone screen where they are washed by one or more water showers. The washed and diluted materials fall by gravity to the bottom area of the conical screen as rotation continues, the materials concurrently being advanced toward the discharge end of the cone by reason of its geometry. This repetitious washing serves to free the usable fibers from the residual waste, which along with the water, flow through the perforations. Preferably, the one or more showers will be mounted above the rotating cone screen and extend the lengths of the first and second zones.

The third or final zone comprises a thickening zone for the residual or rejected materials. Both the longitudinal baffles and the shower terminate at the leading end of the third zone so that only dewatering of the residual material takes place in this zone, the inner surface of the cone screen being provided with curved guide bars on its inner surface which assists is advancing the dewatered residual materials to the discharge end of the cone for removal, the rejected materials falling into an underlying receptacle or onto a discharge conveyor for subsequent disposal. The water and usable fibers which are passed through the cone screen are collected in an underlying tank from which they are pumped for reuse.

DESCRIPTION OF THE DRAWINGS

FIG. 1 is a vertical sectional view of a cone screen separator in accordance with the invention taken along the line 1—1 of FIG. 2.

FIG. 2 is an end elevational view taken from the right end of FIG. 1.

FIG. 3 is an end elevational view taken from the left end of FIG. 1.

FIG. 4 is a diagrammatic perspective view with parts broken away illustrating the cone separator, including its three operating zones.

DESCRIPTION OF THE PREFERRED EMBODIMENT

Referring first to FIG. 1 of the drawings, a conical screen separator in accordance with the invention comprises a housing 1 having an inlet chamber 2 into which the raw materials to be processed are introduced, the materials flowing through inlet opening 3 into the lower extremity of the leading end of a conical screen separator, indicated generally at 4.

The conical screen separator 4 comprises the frustrum of a cone having its largest diameter at its leading end and its smallest diameter at its trailing end where the separator is in communication with a discharge chamber 5 having a bottom opening 6 through which the residual raw materials or rejects are discharged for subsequent disposal. The chamber 5 has sloping side walls 7 (seen in FIG. 2) which direct the reject materials and the like downwardly to the bottom of the chamber for discharge through outlet 6. The screened or processed materials which pass through the screen surface of the separator are collected in a collection chamber 8 underlying the conical screen separator, the collection chamber having an end wall 8a separating it from discharge chamber 5 and a discharge conduit 9 for reclaimed materials collected in chamber 8.

The conical screen separator has an axis defining shaft 10 the trailing end of which is rotatably journaled in a pillow block bearing 11 mounted on a supporting flange 12 secured to the adjacent end wall of the housing 1. At its opposite or leading end the shaft is rotatably journaled in a pillow block 13 mounted on a support 14 secured to the outer wall 15 of inlet chamber 2, the support 14 also mounting, as best seen in FIG. 3, a gear box 16 operatively connected to a variable speed drive motor 17, the gear box having a drive sprocket 18 connected by chain 19 to driven sprocket 20 keyed to the leading end of the shaft 10 so that the shaft is caused to rotate, normally in the direction of the Arrow A seen in FIG. 3.

The shaft 10 mounts spaced apart sets of radially extending spiders 21 and 22 the arms of which mount the conical screen 23 which defines the frustoconical surface of the separator. In an exemplary embodiment, the conical screen separator has a 36" diameter at its leading end tapering downwardly to a 28" diameter at its trailing or discharge end, the operative length of the separator being 66". While the foregoing dimensions are exemplary only, they nonetheless indicate the relatively compact size of the unit. Similarly, by way of illustration, the rotation of the screen separator at a speed of about 15 r.p.m. has been found to produce excellent fiber separation, although the speed of rotation may be varied as desired in accordance with the nature and composition of the materials being processed. Preferably, the spiders 21 and 22 will be spaced apart so as to divide the conical separator into three zones, the first zone lying between the leading end of the separator and spider 22, the second zone lying between spiders 21 and 22, and the third zone lying between spider 21 and the trailing end of the separator. The zones so defined are indicated in FIG. 4, zones 1 and 3 each occupying approximately one-fifth the length of the separator, with zone 2 occupying approximately three-fifths of its length.

The conical screen 23 is perforated to form a screen surface which may be fabricated from metal or plastic. The perforations may comprise openings of various sizes and shapes, such as circular openings or elongated slots, the principal criteria being the size of the fibers or other materials to be passed through the screen. By way of example, in a unit designed for use in a paper mill to screen usable fibers residual waste, the screen may be uniformly perforated by ⅛" diameter circular openings spaced to provide approximately 40% open area throughout the surface of the separator. It will be understood, of course, that different sizes and spacings of openings may be utilized, as well as combinations of openings of different configurations, depending upon the nature of the materials being processed.

At its leading end, i.e., at the entrance to the first zone, the conical separator is provided with a peripheral dam 24 which acts to prevent incoming raw materials from spilling out the leading end of the separator, the raw materials, upon being introduced into the first zone, being advanced toward the second zone by reason of the configuration of the separator and by means of a plurality of curved breaker bars 25 secured to the inner surface of conical screen 23, the breaker bars also acting to control dewatering by preventing the build-up of thickened masses of raw materials which tend to form within the separator unless broken-up by the breaker bars. The breaker bars may comprise lengths of angle stock inclined at a slight angle with respect to the longitudinal axis of the separator, the stock being curved so that its base will conform to the curvature of the conical screen.

A second peripheral dam 26 is provided at the trailing end of the first zone, the second dam being secured to the spider 22 with its periphery spaced inwardly from the inner surface of the conical screen, preferably by a distance of approximately ⅜", the function of the second peripheral dam being to permit passage of the raw materials into the second zone while preventing surges of incoming raw materials from washing directly into the second zone without sufficient holding time in the first zone to effect the desired initial dewatering of the incoming raw materials.

However, while the function of the first zone is to dewater the raw materials and hence effectively thicken or concentrate them, the raw materials are nonetheless subjected to the action of an overlying shower 27 which extends throughout the length of the first and second zones. The shower, which comprises a dilution system, is positioned to impinge upon the outer surface of the rotating conical screen between the ten and two o'clock positions in its direction of rotation. In the embodiment illustrated, the shower 27 comprises a gravity flow shower, which in itself is of conventional construction, although the gravity shower may be replaced by one or more pressure showers similarly positioned and provided with a plurality of spray nozzles positioned to impinge upon the outer surface of the conical screen. A gravity shower is preferred, however, in that it is a simpler and less expensive construction and is not susceptible to being clogged by contaminants, as are the nozzles of spray showers.

The function of the shower is two-fold, one function being to wash the raw materials being processed so as to thereby facilitate fiber separation, and the second function being to clean and unclog the perforations in the conical screen. To this end, particles which are too large to pass through the perforations will be returned to the interior of the conical separator, whereas reclaimable fibers which have been entrapped in the perforations by larger particles may be either returned to the interior of the separator for later reclamation or washed free from the perforations on the outer surface of the conical screen where they will be carried downwardly around the screen and guided into the underlying collection chamber 8.

The second zone of the separator is designed to repeatedly wash or decant the thickened or concentrated materials which have collected on the inner surface of the conical screen, the repeated washings acting to separate the usable fibers from the residual raw materials. In order to enhance the washing action the second zone is provided with a series of longitudinal baffles 28, preferably four in number, extending between and attached to the arms of the spiders 21 and 22. The baffles are preferably of tubular configuration and mounted with clearance between their outermost surfaces and the inner surface of the conical screen 23. In an exemplary embodiment a ⅜" clearance is provided. With this arrangement, the baffles rotate with the conical screen to carry the raw materials into the upper shower area where they are washed and diluted by the shower water. The diluted materials fall to the bottom area of the conical screen and are moved forwardly through the zone by reason of the geometry of the conical screen separator, it being remembered that the axis of rotation of the separator is inclined downwardly from the horizontal in the direction of travel of the raw materials, with the undersurface of the conical screen lying in an essentially horizontal plane. These baffles also effectively control the dewatering as well as prevent the build-up of masses of the raw materials.

As the advancing raw materials pass the spider 21 they enter the third or reject thickening zone where final dewatering of the residual raw materials takes place. Both the shower 27 and the baffles 28 terminate at the trailing end of the second zone, the third zone being equipped with a series of curved guide bars 29 corresponding in construction and location to the breaker bars 25 in zone one, the guide bars acting to assist in rapidly advancing the dewatered rejects toward the trailing end of the conical screen for discharge into the discharge chamber 5. The trailing end of the conical screen is unobstructed so that the residual raw materials may freely fall from the conical screen.

As should now be evident, the instant invention provides a highly efficient yet compact screen separator which is economical to fabricate. By utilizing a conical screen with its axis of rotation inclined so that the undersurface of the screen lies in an essentially horizontal plane, the raw materials are effectively advanced from the larger leading end of the separator to the smaller discharge end without the necessity of providing complicated conveyor means to advance the raw materials through the separator. The entire structure is easy to clean and is effectively self-cleaning by reason of the showers, and hence capable of operating for long periods of time without having to be shut down. By dividing the interior of the separator into three treatment zones, the materials being processed are subjected to a successive series of operations which effectively and efficiently separate usable fibers from the residual waste, all in a continuous operation.

Modifications may be made in the invention without departing from its spirit and purpose. Several such modifications have already been set forth and others will undoubtedly occur to the skilled worker in the art upon reading this specification. Accordingly, it is not intended that the invention be limited other than in the manner set forth in the claims which follow.

The embodiments of the invention in which an exclusive property or privilege is claimed are defined as follows:

1. A screen separator comprising a frustoconical screen having a perforated surface, the longitudinal axis of said screen being inclined from the horizontal so that the undersurface of the screen lies in an essentially horizontal plane, means for rotating said screen, means for introducing materials to be separated into the larger end of said screen, means at the smaller end of said screen for receiving residual materials discharged from the smaller end of said screen, a recovery tank underlying said screen for receiving separated materials passed through the perforations in said screen, means dividing said screen internally into at least three zones, the first zone comprising a dewatering zone at the larger end of said screen, the second comprising a washing zone adjacent said first zone, and the third comprising a dewatering zone at the smaller end of said screen, shower means overlying said screen throughout the lengths of said first and second zones only, and internal baffle means extending longitudinally from the smaller end of said first zone to the larger end of said third zone, said baffles lying in close proximity to, but spaced from the inner surface of said screen.

2. The screen separator claimed in claim 1 including a shaft lying along the longitudinal axis of said frustoconical screen, said shaft being operatively connected to the means for rotating said screen, and wherein the means dividing said screen into zones comprises a spaced apart pair of spiders projecting radially outwardly from said shaft, said screen being attached to the outer ends of said spiders.

3. The screen separator claimed in claim 2 wherein said baffles are mounted on and extend between said spiders adjacent the outermost ends of said spiders.

4. The screen separator as claimed in claim 3 wherein said baffles are of tubular configuration.

5. The screen separator claimed in claim 2 wherein a first peripheral dam is secured to said frustoconical screen at its larger diameter end, and wherein a second peripheral dam is secured to the spider dividing said first and second zones, said second peripheral dam lying in spaced relation to the inner surface of said screen.

6. The screen separator claimed in claim 5 including breaker bars in said first zone, said breaker bars being positioned to assist in directing the materials being processed through said zone and control dewatering by preventing the build-up of masses of thickened raw materials.

7. The screen separator claimed in claim 6 including guide bars in said third zone positioned to rapidly advance the residual materials through the third zone for discharge.

8. The screen separator claimed in claim 7 wherein said breaker bars and said guide bars comprise curved angle bars secured to the inner surface of said frustoconical screen, said angle bars being angularly disposed with respect to the longitudinal axis of said screen.

9. The screen separator claimed in claim 1 wherein said shower means is positioned to impinge upon the outer surface of said frusto-conical screen at a position between ten and two o'clock with respect to the direction of rotation of said screen.

10. The screen separator claimed in claim 9 wherein said shower comprises a gravity shower.

* * * * *